(12) United States Patent
Zhang

(10) Patent No.: US 9,873,358 B2
(45) Date of Patent: Jan. 23, 2018

(54) LOCKING DEVICE FOR BABY CAR SEAT

(71) Applicant: GOODBABY CHILD PRODUCTS CO., LTD, Kunshan, Jiangsu (CN)

(72) Inventor: Xiaoguang Zhang, Kunshan (CN)

(73) Assignee: GOODBABY CHILD PRODUCTS CO., LTD., Kunshan (CN)

( * ) Notice: Subject to any disclaimer, the term of this patent is extended or adjusted under 35 U.S.C. 154(b) by 44 days.

(21) Appl. No.: 14/785,450

(22) PCT Filed: Dec. 13, 2013

(86) PCT No.: PCT/CN2013/089355
§ 371 (c)(1),
(2) Date: Oct. 19, 2015

(87) PCT Pub. No.: WO2014/176909
PCT Pub. Date: Nov. 6, 2014

(65) Prior Publication Data
US 2016/0052426 A1 Feb. 25, 2016

(30) Foreign Application Priority Data

Apr. 28, 2013 (CN) ...................... 2013 2 0229467 U

(51) Int. Cl.
*B60N 2/28* (2006.01)
*B60N 2/44* (2006.01)

(52) U.S. Cl.
CPC ............. *B60N 2/28* (2013.01); *B60N 2/2887* (2013.01); *B60N 2/443* (2013.01); *B60N 2/4435* (2013.01)

(58) Field of Classification Search
CPC ........ B60N 2/28; B60N 2/2887; B60N 2/443; B60N 2/4435
(Continued)

(56) References Cited

U.S. PATENT DOCUMENTS 5,466,044 A * 11/1995 Barley ................. B60N 2/2821
297/250.1
5,487,588 A * 1/1996 Burleigh .............. B60N 2/2806
297/250.1
(Continued)

FOREIGN PATENT DOCUMENTS

CN 1650768 A 8/2005
CN 201472193 U 5/2010
(Continued)

OTHER PUBLICATIONS

Mar. 20, 2014 Search Report issued in International Patent Application No. PCT/CN2013/089355.

*Primary Examiner* — Syed A Islam
(74) *Attorney, Agent, or Firm* — Oliff PLC

(57) ABSTRACT

A locking device for a baby car seat for cooperating with a locking rod on a car seat to connect the baby car seat to the car seat is disclosed, the locking device including: an installation rack, a locking member rotatably connected to the installation rack via a first shaft, the installation rack being provided with a locking groove for receiving the locking rod, and the locking member being provided with a locking hook for hooking the locking rod and locking the locking rod in the locking groove. The locking device further includes a button and a stopping block movably provided on the installation rack along a length direction of the installation rack, the button including a driving pin, the locking member provided with a driving groove in which the driving pin is movably inserted, the locking member being driven to rotate about the first shaft when the button moves.

10 Claims, 4 Drawing Sheets

(58) Field of Classification Search
USPC .......................................... 297/463.1; 24/253
See application file for complete search history.

(56) References Cited

U.S. PATENT DOCUMENTS

| | | | | |
|---|---|---|---|---|
| 5,524,944 A * | 6/1996 | Berg | ..................... | E05B 67/383 292/148 |
| 6,082,819 A * | 7/2000 | Jackson | ............... | B60N 2/2821 297/250.1 |
| 6,209,957 B1 * | 4/2001 | Baloga | ................. | B60N 2/2821 297/250.1 |
| 6,375,260 B1 * | 4/2002 | Hiramatsu | ........... | B60N 2/2821 297/250.1 |
| 6,681,969 B1 * | 1/2004 | Giedeman, III | ........ | B60R 7/043 224/275 |
| 6,868,591 B2 * | 3/2005 | Dingman | ............. | A44B 11/2511 24/615 |
| 6,962,394 B2 * | 11/2005 | Anthony | .............. | B60N 2/2806 24/633 |
| 7,837,275 B2 * | 11/2010 | Woellert | ............... | B60R 22/105 297/253 |
| 8,328,281 B2 * | 12/2012 | Balensiefer, II | ..... | B60N 2/2806 297/250.1 |
| 8,646,158 B2 * | 2/2014 | Buckingham | ........ | B60N 2/2806 24/599.1 |
| 8,656,566 B1 * | 2/2014 | Chen | ................... | A44B 11/2511 24/631 |
| 8,713,765 B2 * | 5/2014 | Buckingham | ........ | B60N 2/2806 24/599.1 |
| 9,015,911 B2 * | 4/2015 | Xu | ....................... | B60N 2/2887 24/599.1 |
| 9,120,403 B2 * | 9/2015 | Hutchinson | ............ | B60N 2/265 |
| 2003/0030311 A1 * | 2/2003 | Woodard | ............... | B60N 2/2806 297/250.1 |
| 2004/0208692 A1 * | 10/2004 | Anthony | .............. | A01K 27/005 403/327 |
| 2005/0115035 A1 | 6/2005 | Karlsson | | |
| 2007/0067970 A1 * | 3/2007 | Claus | ..................... | F16B 45/02 24/599.9 |
| 2007/0262636 A1 * | 11/2007 | Gastaldi | ............... | B60N 2/2806 297/463.1 |
| 2007/0284924 A1 * | 12/2007 | Gold | ................... | B60N 2/2821 297/253 |
| 2010/0013282 A1 * | 1/2010 | Balensiefer | ......... | B60N 2/2887 297/253 |
| 2010/0072798 A1 * | 3/2010 | Clement | .............. | B60N 2/2893 297/253 |

FOREIGN PATENT DOCUMENTS

| | | |
|---|---|---|
| CN | 202088925 U | 12/2011 |
| CN | 202448783 U | 9/2012 |
| CN | 102923023 A | 2/2013 |
| CN | 203228666 U | 10/2013 |
| KR | 20140070154 A | 6/2014 |
| WO | 2010/036753 A1 | 4/2010 |

* cited by examiner

LOCKING DEVICE FOR BABY CAR SEAT

FIELD OF THE INVENTION

The present invention relates to a locking device for a baby car seat.

BACKGROUND ART

A locking device/mechanism for a baby car seat in the prior arts, such as the one in the Chinese utility model patent CN201472193U, comprises: a base whose front end is provided with a locking groove and whose inside is provided with a cavity; and a locking hook provided in the cavity and rotatably connected to the base via a rotating shaft, a front part of the locking hook including a hooking groove with an downward opening, wherein the locking mechanism includes a first working position and a second working position; in the first working position, the hooking groove faces and cooperates with the locking groove to lock a locking rod of a car seat; in the second working position, the hooking groove is located above the locking groove to form an opening through which the locking rod of the car seat can be released; and wherein the rotating shaft is located at the rear and lower portion of the locking hook. The locking mechanism further comprises: a driving sliding block slidably provided on the base along the length direction of the base; and a first elastic member provided between the base and the driving sliding block so that the locking mechanism can be stably maintained at the first working position, the driving sliding block is connected to the upper portion of the hooking groove above the rotating shaft, wherein the locking hook is provided with a pin, and a front part of the driving sliding block is provided with an aperture into which the pin is inserted. The locking hook has a sheet-like shape and is provided in two sheets provided at an inner side of the driving sliding block respectively. Both sides of the base are provided with arcuate apertures respectively. One pin is provided on the two sheets, and the two ends of the pin are inserted into the arcuate apertures respectively. The locking mechanism further comprises a traction member slidably provided on the base along the length direction of the base, a front end of the traction member connected to the driving sliding block.

SUMMARY OF THE INVENTION

One technical problem to be solved by this invention is to provide an improved locking device for a baby car seat.

To solve this technical problem, this invention employs the following technical solution: a locking device for a baby car seat for cooperating with a locking rod on a car seat to connect the baby car seat to the car seat, the locking device having an unlocked state and a locked state and comprising: an installation rack, a locking member rotatably connected to the installation rack via a first shaft, the installation rack being provided with a locking groove for receiving the locking rod, and the locking member being provided with a locking hook for hooking the locking rod and locking the locking rod in the locking groove. The locking device further comprises a button and a stopping block movably provided on the installation rack along a length direction of the installation rack, the button including a driving pin, the locking member being provided with a driving groove in which the driving pin is movably inserted, the locking member being driven to rotate about the first shaft by cooperation between the driving pin and the driving groove when the button moves, the stopping block provided on the installation rack or the button, movable along the length direction of the installation rack and including two working positions, wherein, when at a first working position, the stopping block abuts against the locking hook or other parts of the locking member so that the locking hook deviates from the locking groove, and the locking rod inserted into the locking groove pushes the stopping block from the first working position and moves the stopping block to a second working position; when at the second working position, the stopping block releases the locking member, and moves the locking member to allow the locking hook to reach a position corresponding to the locking groove, whereby the locking rod in the locking groove is hooked and the locking device enters the locked state. The stopping block is maintained at the first working position by a force applied by a second elastic member. When the stopping block moves from the first working position and towards the second working position, a reaction force is applied to the second elastic member to deform the same. When the locking rod moves away from the locking groove and releases the stopping block, the second elastic member is restored to generate a reaction force to the stopping block, moving the stopping block back to the first working position. "A position corresponding to the locking groove" mentioned here and in other parts of this application means insertion into or facing the locking groove, and the opposite meaning of this term is deviation from the locking groove.

Preferably, the second elastic member is provided between the stopping block and the button, wherein when the stopping block moves away from the first working position and towards the second working position, the second elastic member applies a force to the button and moves the same, whereby the locking member is driven to rotate to allow the locking hook to reach a position corresponding to the locking groove, and the locking rod inserted in the locking groove is hooked by the locking hook and the locking device enters the locked state.

In a specific embodiment, the locking groove is provided at a rear end part of the installation rack, and has an opening rearwards through which the locking rod on the car seat can be inserted into the locking groove.

Specifically, the stopping block is provided at a rearward lateral part of the installation rack or the button, and the locking hook is formed at a rear part of the locking member.

Preferably, the locking hook is formed by an end of the locking member extending and bending downwards, wherein, when the stopping block is at the first working position, a lower part of the locking hook presses the stopping block and deviates from the locking groove, and an included angle between 0 and 180 degrees is formed between an axis of the first shaft and the vertical plane, or the axis of the first shaft is not perpendicular to the horizontal plane. In this case, when the stopping block moves from the first working position, the locking hook can deflect downwards due to gravity to reach a position corresponding to the locking groove.

More preferably, the axis of the first shaft extends horizontally.

More preferably, the axis of the first shaft is perpendicular to the direction along which the installation rack slides.

In a preferred embodiment, a first elastic member is connected between the locking member and the button for applying a force to the locking member, whereby the locking hook of the locking member is maintained at a position corresponding to the locking groove, so that the locking device enters the locked state and a connection between the first elastic member and the locking member deviates from the first shaft by a certain distance. Specifically, in this structure, the second elastic member may be arranged between the stopping block and the installation rack.

More preferably, both the first elastic member and the driving pin are located in front of the first shaft, and the locking hook is located rearwards of the first shaft to form a leverage.

In a specific embodiment, a groove wall of the driving groove has a position limiting part, wherein when the locking device is in the locked state, the driving pin is maintained at the position limiting part, so that the locking member and the button are kept still, and when the locking device is in the unlocked state, the position limiting part moves away from the driving pin to release the same, and the button can move.

In a specific embodiment, the installation rack is provided with a guide groove along the length direction thereof, wherein the driving pin can be slidably inserted into the guide groove, and the guide groove can guide and restrict movement of the button relative to the installation rack.

Preferably, the locking device further comprises a shell covering the button, the locking member and the stopping block.

Preferably, the number of the button, the locking member, the stopping block and the installation rack is two, respectively, each of these members being connected according to the above manner. That is, each locking member is rotatably connected to a corresponding installation rack, each button is provided on a corresponding installation rack, each stopping block is provided on a corresponding button or installation rack, and the two installation racks are connected by a safety belt.

The scope of this invention is not limited to the technical solutions formed by specific combinations of the above technical features, but covers other technical solutions formed by any combinations of the above technical features or their equivalents, including the technical solutions formed by substituent technical features having similar functions substituting the technical features disclosed by this application (but not limited thereto).

Due to the above technical solutions, this invention has the following advantages over the prior arts: this invention provides a novel technical solution, in which: when the locking rod of the car seat is pushed into the locking groove, the locking rod pushes the stopping block away from the locking groove, whereby the button moves accordingly; the driving pin pushes the locking member to rotate the same about the first shaft, whereupon the locking hook hooks the locking rod to lock the same; when the button is pressed, the button overcomes an elastic force of the second elastic member to move, and the driving pin moves rearwards to cause the locking member to rotate reversely about the first shaft, whereupon the locking hook releases the locking rod, and the locking rod is released from the locking groove; meanwhile, due to the force applied by the second elastic member, the stopping block returns to the position corresponding to the locking groove automatically.

DESCRIPTION OF THE EMBODIMENTS

Figure 1:
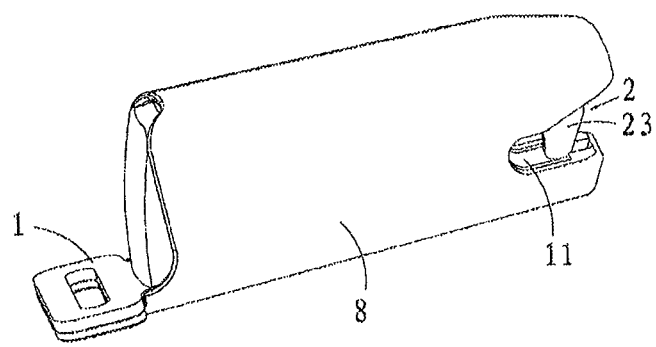
FIG. 1 is a perspective view of this invention.
Figure 2:
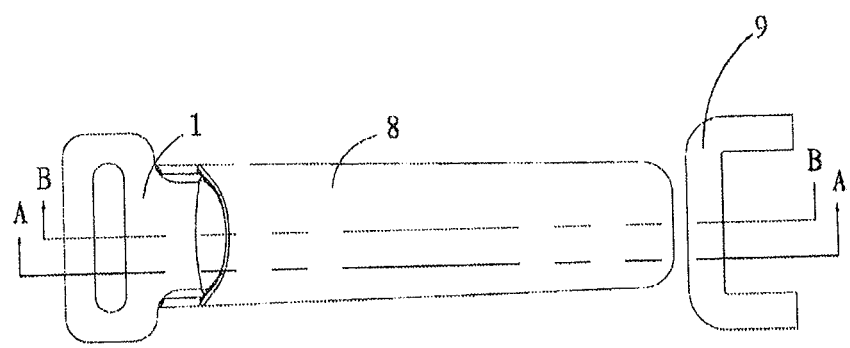
FIG. 2 is a bird's view of this invention.

A baby car seat needs to be connected to a car seat. Usually, locking rods 9 are provided at both sides at a lower part of a backrest of a car seat. FIGS. 2-7 show a part of the locking rod 9 with omissions, each figure showing a single locking rod 9. The locking rod 9 is used to lock a baby car seat mounted on a car seat.

The locking device for a baby car seat according to this invention comprises two installation racks 1, two locking members 2, two buttons 4 and two stopping blocks 3. Since the two installation racks 1, two locking members 2, two buttons 4 and two stopping blocks 3 may have the same shape, configuration and connection manner, FIGS. 1-7 only show a structure formed by one installation rack 1, one locking member 2, one button 4 and one stopping block 3.

Two installation racks 1 are connected by a safety belt. This is a conventional manner in the art, so the drawings will not illustrate it. A front part of the installation rack 1 often includes a safety belt hole in which an end of the safety belt can be inserted. When in use, the safety belt crosses a body of the baby car seat, which is locked by locking devices at both sides of the baby car seat cooperating with two locking rods 9 on the car seat. Connection by a safety belt may not be used. Two rigid installation tubes may be provided directly from a rear part of the car seat, and the two installation racks of the locking device for a baby car seat may be fixed to the rigid installation tubes respectively.

The embodiments of this invention will be described in detail with reference to the drawings.

Embodiment 1

A locking device for a baby car seat according to FIGS. 1-7 comprises: an installation rack 1 including a locking groove 11 provided from a rear end towards a front end thereof; a locking member 2 rotatably connected to the installation rack 1 about a first shaft 7; a stopping block 3 movably provided at a lateral rear part of the installation rack 1 along a front-to-rear direction of the installation rack 1; and a button 4 movably provided at a front part of the installation rack 1 along the front-to-rear direction of the installation rack 1; wherein a rear end of the locking member 2 is provided with a locking hook 23 formed by bending the rear end of the locking member 2 downwards, a second elastic member 6 is provided between the stopping block 3 and the button 4 to allow the stopping block 3 to move towards a position corresponding to the locking groove 11, the button 4 includes a driving pin 41, and a front part of the locking member 2 is provided with a driving groove 21 in which the driving pin 41 is movably inserted. The locking device has an unlocked state and a locked state. When the locking device for a baby car seat is in the locked state, the stopping block 3 is pushed by the locking rod 9 to deviate from the locking groove 11, the stopping block 3 is located in front of the locking hook 23, and the locking hook 23 is located in the locking groove 11. When the locking device for a baby car seat is in the unlocked state, the stopping block 3 is moved rearwards by the second elastic member 6 to reach a position facing the locking groove 11, and a lower part of the locking hook 23 presses the stopping block 3, so that the locking hook 23 is prevented from moving downwards to a position corresponding to the locking groove 11. The terms "front" and "rear/rearward(s)/backwards" mentioned here and in other parts of this application are defined based on recognition habits of general consumers. In fact, the front-to-rear direction corresponds to the length direction of the installation rack 1 and the left-right direction in FIG. 3, the left being the front and the right being the rearward.

Figure 3:
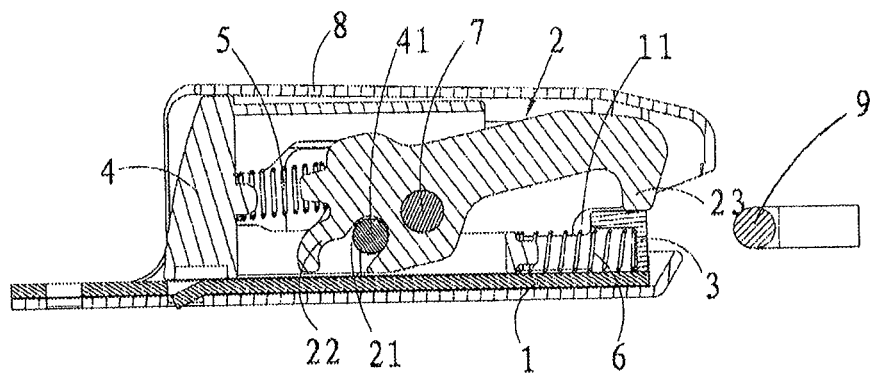
FIG. 3 is a sectional view of FIG. 2 cut along B-B (when the locking device for a baby car seat is in the unlocked state)
Figure 4:
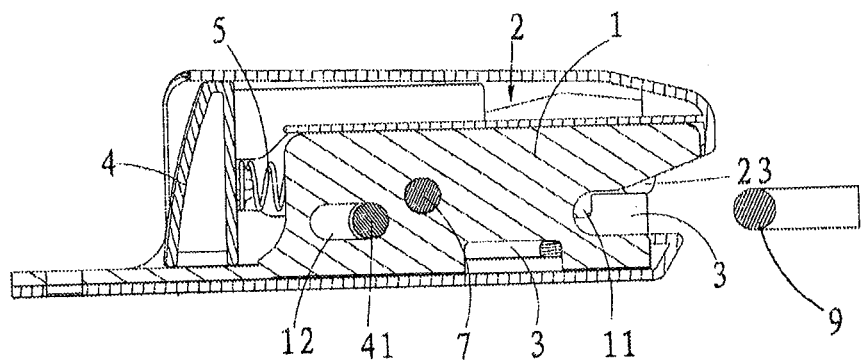
FIG. 4 is a sectional view of FIG. 2 cut along A-A (when the locking device for a baby car seat is in the unlocked state)
Figure 5:
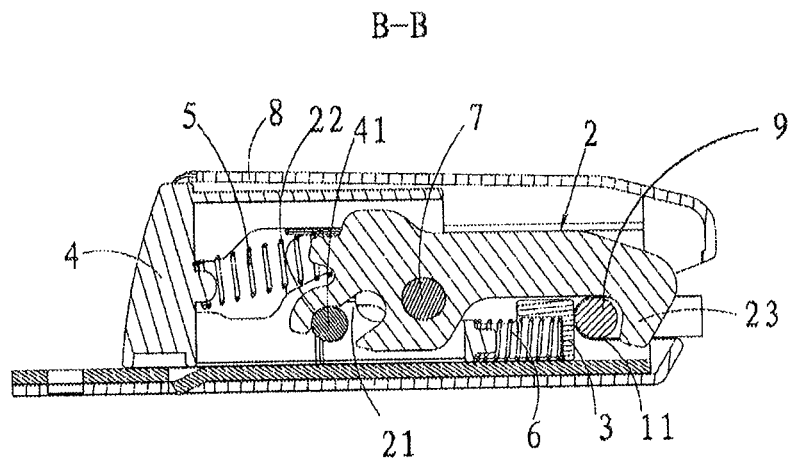
FIG. 5 is a sectional view of FIG. 2 cut along B-B (when the locking device for a baby car seat is in the locked state)
Figure 6:
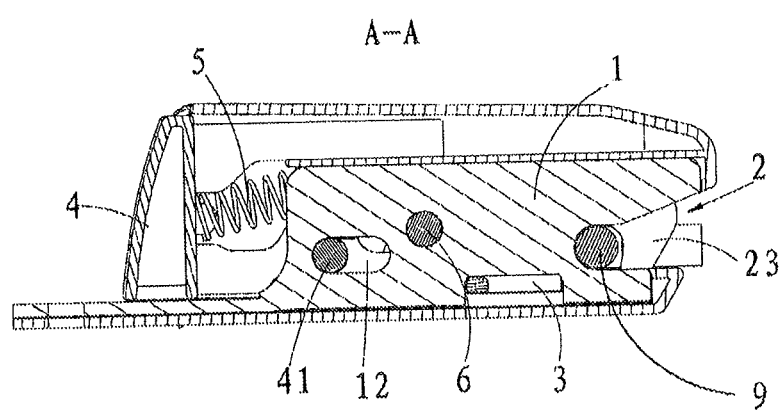
FIG. 6 is a sectional view of FIG. 2 cut along A-A (when the locking device for a baby car seat is in the locked state)
Figure 7:
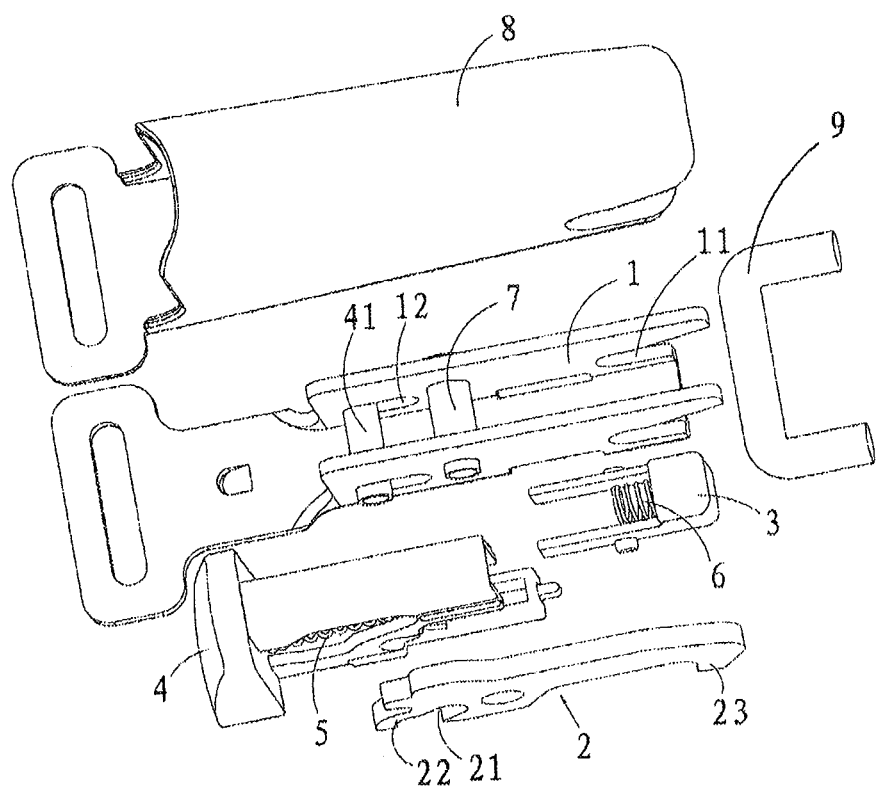
FIG. 7 is an exploded view of this invention, wherein: 1 represents installation rack; 11 locking groove; 12 guide groove; 2 locking member; 21 driving groove; 22 position limiting part; 23 locking hook; 3 stopping block; 4 button; 41 driving pin; 5 first elastic member; 6 second elastic member; 7 first shaft; 8 shell; and 9 locking rod.

As shown in FIG. 7, both sides of the locking groove 11 open outwards. The locking rod 9 on the car seat is inserted into the locking groove 11 from a rear opening of the locking groove 11, and after the insertion, a part of the locking rod 9 extends to a side of the locking groove 11. When the stopping block 3 moves away from the lower part of the locking hook 23 such that the locking hook 23 is released, the locking hook 23 moves downwards to reach a side of the locking groove 11, whereby the locking rod 9 inserted in the locking groove 11 is hooked and the locking device enters the locked state, as shown in FIGS. 5-6. When the locking device is in the unlocked state, the locking hook 23 moves away from the side of the locking groove 11, and the stopping block 3 is maintained at the side of the locking groove 11 due to a force applied by the second elastic member 6, as shown in FIGS. 3-4.

A first elastic member 5 is provided between a front part of the locking member 2 and the button 4 such that the locking hook 23 tends to move towards the locking groove 11. The first elastic member 5 is located in front of and above the driving pin 41. Both the first elastic member 5 and the driving pin 41 are located in front of the first shaft 7, and the locking hook 23 is located rearwards of the first shaft 7.

A length direction of a longitudinal section of the driving groove 21 intersects with a front-to-rear sliding direction of the button 4. In the embodiments shown by the drawings, the driving groove 21 is inclined upwards from the front to the rear thereof.

An upper sidewall at a front part of the driving groove 21 has a position limiting part 22. When the locking device for a baby car seat is in the locked state, the position limiting part 22 presses the driving pin 41 and prevents the locking hook 23 from moving upwards, or the locking hook 23 cannot be unlocked. When the locking device for a baby car seat is switched from the locked state to the unlocked state, the driving pin 41 is moved rearwards along with the button 4. When the locking device for a baby car seat is in the unlocked state, the driving pin 41 is located rearwards of the driving groove 21.

A front part of the installation rack 1 is provided with a guide groove 12 along the length direction of the installation rack 1, and the driving pin 41 is capable of being slidably inserted into the guide groove 12. A shell 8 covers the locking device for a baby car seat.

When the locking device for a baby car seat is in the locked state, only an external force is applied to the button 4 or only when the button 4 is pressed, can the locking hook 23 be unlocked.

The locking rod 9 is a metal bar fixed on the car seat (not shown), as shown in FIGS. 2-7.

Hold the locking device for a baby car seat and push the locking rod 9 into the locking groove 11. The stopping block 3 moves forwards due to a force applied by the locking rod 9. When the stopping block 3 and the locking rod 9 move into the locking hook 23, the locking member 2 rotates backwards and downwards about the first shaft 7 under an elastic force from the first elastic member 5, thereby locking the locking rod 9 in the locking hook 23 and causing the locking device for a baby car seat to enter the locked state. Meanwhile, the driving groove 21 is kept away from restricting the driving pin 41 and allows the same to slide. The button 4 causes the driving pin 41 to move forwards under an elastic force from the second elastic member 6. At this time, the locking member 2 cannot rotate upwards and forwards due to restriction by the driving pin 41, and is locked, so that the locking rod 9 cannot be detached from the locking hook 23.

When unlocking the locking device, the button 4 is pushed rearwards, and causes the driving pin 41 to rotate the locking member 2 counterclockwise about the first shaft 7, thereby releasing the locking rod 9. At this time, the stopping block 3 is ejected rearwards under an elastic force from the second elastic member 6, abutting against the locking hook 23 so that the locking hook 23 cannot be locked. Accordingly, the driving pin 41 cannot move forwards due to restriction of the driving groove 21 of the locking member 2, and the button 4 cannot be restored to its original position.

In the above description, the position of the button 4 refers to the front side, and the position of the locking hook 23 the rear side.

Modifications can be made to the structure in Embodiment 1 by those skilled in the art according to the concept of this invention. For example, the stopping block 3 may be provided on the button 4; the second elastic member 6 may be arranged between the stopping block 3 and the installation rack 1; or when the locking device is in the unlocked state, the stopping block 3 abuts against other parts of the locking member 2 rather than the locking hook 23, etc.

As mentioned above, explanations are made based on the principle of this invention, but this invention is not limited to the above embodiments. Modifications may be made by those skilled in the art within the technical concept of this invention.

The invention claimed is:

1. A locking device for a baby car seat for cooperating with a locking rod on a car seat to connect the baby car seat to the car seat, the locking device having an unlocked state and a locked state and comprising: an installation rack, a locking member rotatably connected to the installation rack via a first shaft, the installation rack being provided with a locking groove for receiving the locking rod, and the locking member being provided with a locking hook for hooking the locking rod and locking the locking rod in the locking groove, the locking device further comprising:
   a button movably provided at a front part of the installation rack along a length direction of the installation rack, the button including a driving pin, the locking member being provided with a driving groove in which the driving pin is movably inserted, and the locking member being driven to rotate about the first shaft by cooperation between the driving pin and the driving groove when the button moves;
   a stopping block movably provided on the installation rack along a length direction of the installation rack or movably provided on the button 4 and including two working positions, wherein, when at a first working position, the stopping block abuts against the locking hook or the locking member, so that the locking hook deviates from the locking groove, the stopping block is pushed away from the first working position by the locking rod inserted into the locking groove and reaches a second working position; and when at the second working position, the stopping block releases the locking member; and a second elastic member for applying a force to the stopping block so that the stopping block is maintained at the first working position, wherein a first elastic member is connected between the locking member and the button for applying a force to the locking member, whereby the locking hook of the locking member is maintained at a position corresponding to the locking groove, so that the locking device is in the locked state and a connection between the first elastic member and the locking member deviates from the first shaft by a certain distance, the stopping block is provided at a rearward lateral part of the installation rack or at a rearward lateral part of the button, and the locking hook is formed at a rear part of the locking member; the locking groove is provided at a rear end part of the installation rack, and has an opening rearwards through which the locking rod on the car seat can be inserted into the locking groove; the second elastic member is provided between the stopping block and the button, and when the stopping block moves away from the first working position and towards the second working position, the second elastic member applies a force to the button and the driving pin moves forward, whereby the locking member is driven to rotate to allow the locking device to enter the locked state.

2. The locking device for a baby car seat according to claim 1, wherein the locking hook is formed by an end of the locking member extending and bending downwards, and wherein, when the stopping block is at the first working position, a lower part of the locking hook presses the stopping block and deviates from the locking groove, and an included angle between 0 and 180 degrees is formed between an axis of the first shaft and a vertical plane.

3. The locking device for a baby car seat according to claim 2, wherein the axis of the first shaft extends horizontally.

4. The locking device for a baby car seat according to claim 2, wherein the axis of the first shaft is perpendicular to the direction along which the stopping block slides relative to the installation rack.

5. The locking device for a baby car seat according to claim 1, wherein the second elastic member is arranged between the stopping block and the installation rack.

6. The locking device for a baby car seat according to claim 1, wherein both the first elastic member and the driving pin are located in front of the first shaft, and the locking hook is located rearwards of the first shaft.

7. The locking device for a baby car seat according to claim 1, wherein a groove wall of the driving groove has a position limiting part, and wherein when the locking device is in the locked state, the driving pin is maintained at the position limiting part; and when the locking device is in the unlocked state, the position limiting part moves away from the driving pin to release the same.

8. The locking device for a baby car seat according to claim 1, wherein the installation rack is provided with a guide groove along the length direction thereof, and the driving pin is capable of being slidably inserted into the guide groove.

9. The locking device for a baby car seat according to claim 1, wherein the locking device further comprises a shell covering the button, the locking member and the stopping block.

10. The locking device for a baby car seat according to claim 1, wherein the number of the button, the locking member, the stopping block and the installation rack is two, respectively, each locking member is rotatably connected to a corresponding installation rack, each button is provided on a corresponding installation rack, each stopping block is provided on a corresponding button or installation rack, and the two installation racks are connected by a safety belt.

* * * * *